United States Patent [19]

Tonna

[11] Patent Number: 4,801,462
[45] Date of Patent: Jan. 31, 1989

[54] METHOD AND APPARATUS OF BREWING

[75] Inventor: Arthur Tonna, Grosse Point Shores, Mich.

[73] Assignee: The Stroh Brewery Company, Detroit, Mich.

[21] Appl. No.: 15,586

[22] Filed: Feb. 17, 1987

Related U.S. Application Data

[63] Continuation of Ser. No. 730,784, May 6, 1985, abandoned.

[51] Int. Cl.$^4$ ............................................. C12C 11/04
[52] U.S. Cl. ....................................... 426/16; 426/29; 426/592; 99/278
[58] Field of Search ..................... 426/15, 16, 29, 592; 99/278

[56] References Cited

PUBLICATIONS

"The Practical Brewer, A Manual for the Brewing Industry" Impressions The Publisher (1977) pp. 122–126.

Steinecker "Our Production Programme" Printed in West Germany Apr. 1985 pp. 1–7.
Uniflux "Advantages of the Mini-Uniflux", Uniflux Publishers Printed in U.S.A. pp. 1–3.
Huppmann Energy Saving Boiling System, Huppmann GmbH.

*Primary Examiner*—R. B. Penland
*Attorney, Agent, or Firm*—Andrus, Sceales, Starke & Sawall

[57] ABSTRACT

Wort, heated to boiling in a brew kettle, is continuously withdrawn from the brew kettle and passed through a copper heat exchange coil in an external heat exchanger. Hot combustion gases are discharged at high velocity into direct contact with the heat exchange coil to thereby heat the wort flowing through the coil to a temperature in the range of 220° to 240° F. The heated wort is then returned to the brew kettle and discharged at a location beneath the level of the wort in the kettle. The direct firing of the wort in the copper heat exchange coil provides improved flavor characteristics for the beer.

9 Claims, 1 Drawing Sheet

U.S. Patent    Jan. 31, 1989    4,801,462
FIG. 1
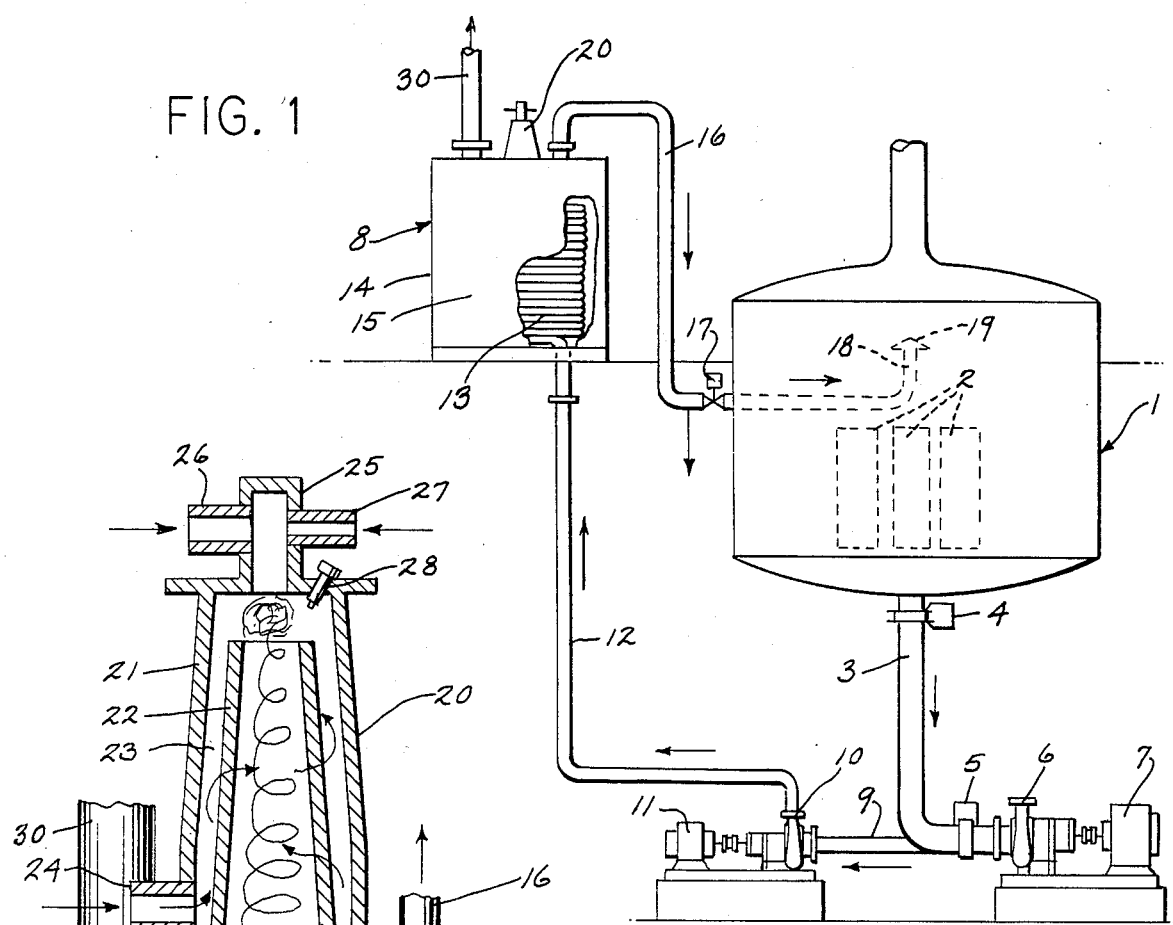
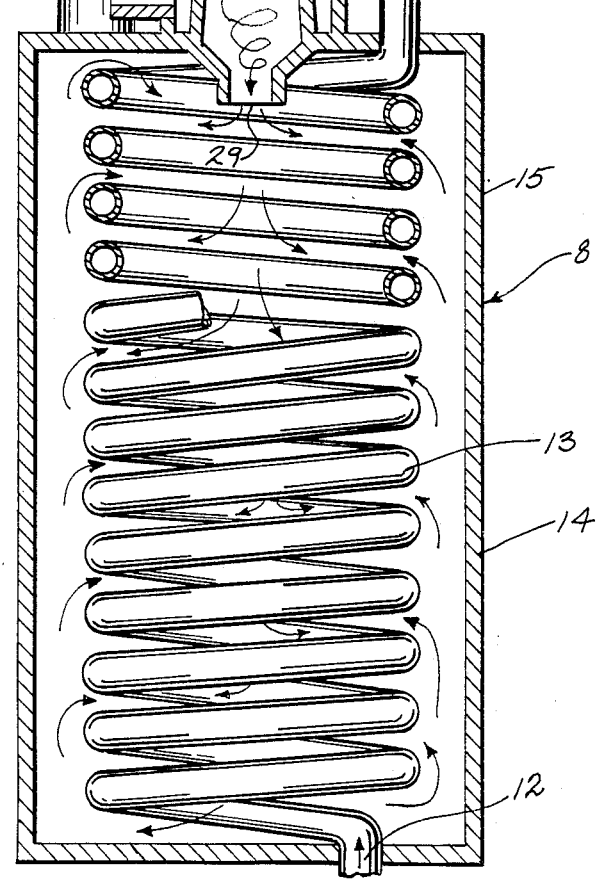
FIG. 2

METHOD AND APPARATUS OF BREWING

This is a continuation of application Ser. No. 06/730,784, filed May 6, 1985, now abandoned.

BACKGROUND OF THE INVENTION

In brew kettle operation, heating of the wort causes coagulation of proteins, sterilization of the wort and the destruction of enzymes, extraction of hops and evaporation of excess water to provide a general change of the wort through boiling. The evaporation rate, temperature and circulation of wort in the brew kettle are important factors in the effective coagulation of protein as well as hop extraction and hop character.

In the past, "fire brewing" has been used to impart improved flavor characteristics to the beer. In traditional fire brewing, the wort is boiled in small copper kettles that are subjected to direct oil or gas firing. The direct firing of the work in the copper kettles is believed to effect the carmelization and improve the flavor of the beer.

It is also known to circulate boiling wort through external heat exchangers and return the wort to the brew kettle through center tube spreaders in order to obtain more efficient mixing and energy savings. In a system of this type, known as Kalandria, the wort is passed through stainless steel tubes in an external heat exchanger in heat transfer relation to steam, and the wort, having been heated several degrees, is then returned to the brew kettle and is discharged through a center tube above the level of wort in the kettle.

SUMMARY OF THE INVENTION

The invention is directed to an improved process and apparatus for brewing which achieves the effect of fire brewing as used in the past. In accordance with the invention, boiling wort from the brew kettle is continuously circulated through an external heat exchanger and is discharged back to the brew kettle at a location beneath the level of wort in the kettle.

The heat exchanger includes a heat exchange section having a copper heat exchange coil through which the wort is circulated. A fuel, such as natural gas, is combusted in the reactor section of the heat exchanger, and the gases of combustion are discharged at high velocity over the copper coil to heat the circulating wort to a temperature in the ragne of 220° to 240° F. A control valve in the recirculation system is utilized to provide the desired back pressure in the recirculating line and the residence time of the wort in the heat exchange coil.

The direct heating of the wort in the copper coils provides a fire brewing treatment that improves the flavor characteristics of the beer.

DESCRIPTION OF THE DRAWINGS

FIG. 1 is a schematic representation of the brewing process of the invention; and FIG. 2 is a longitudinal section of the external heat exchanger.

DESCRIPTION OF THE ILLUSTRATED EMBODIMENT

FIG. 1 is a schematic representation of the brewing apparatus and process of the invention, and includes a conventional brew kettle 1 to contain wort. A series of percolators 2 are mounted in the brew kettle and served in the conventional manner to agitate and circulate the wort in the desired pattern.

Located in the lower end of brew kettle 1 is a discharge line 3, and valves 4 and 5 are connected in line 3. The lower end of line 3 is connected to the suction side of a pump 6 which is driven by motor 7 so that operation of pump 6, when valves 4 and 5 are open, will drain wort from the brew kettle.

In accordance with the invention, the boiling wort is circulated through a heat exchanger 8 which is located outside of the brew kettle. Conduit 9 connects discharge line 3 to the inlet side of a pump 10 driven by motor 11, while the discharge line of pump 10 is connected through line 12 to one end of a copper coil 13 disposed in the heat exchanger section 14 of heat exchanger 8. As best shown in FIG. 2, coil 13 has a spiral configuration and the tubing of the coil has a relatively large diameter in the neighborhood of 4 inches. The large diameter tubing permits the free flow of hops and other materials contained in the wort.

Coil 13 is contained within an outer housing 15 and the upper end of the coil 13 is connected through a line 16 to brew kettle 1. Mounted in line 16 is a control valve 17, and by adjustment of valve 17 the flow rate of wort through the heat exchange coil 13 can be varied as desired. Adjustment of valve 17 regulates the back pressure of the circulating wort and controls the residence time of the wort within the coil 13 to obtain the proper heating of the wort.

Conduit 16 extends through an opening in the sidewall of brew kettle and terminates in an upwardly extending discharge pipe 18 having an open upper end. A deflector plate 19 is mounted in spaced relation to the upper end of pipe 18 and both the upper end of pipe 18 and the deflector 19 are located beneath the level of the wort in brew kettle 1. The wort being returned to brew kettle 1 is discharged in the brew kettle upwardly in the same general direction as the percolation to thereby increase the efficiency of the mixing of the recirculating wort in the kettle.

The wort passing through the coil 13 is heated by combustion gases that are generated in reactor section 20 of heat exchanger 8. As shown in FIG. 2, reactor section 20 includes an outer casing 21 and an inner casing 22 which is spaced radially inward of casing 21 to provide an annular space 23 between the casings. Air for combustion purposes is introduced tangentially into the lower end of the annular space 23 through tangential inlet 24. The combustion air is supplied to the inlet by a suitable blower, not shown.

The combustion air circulates upwardly within space 23 to the upper end of the reactor section 20 where it is mixed with gas introduced into the reactor section through inlet 25. As shown in FIG. 2, both a fuel gas line 26 and a pilot gas line 27 are connected to inlet 25. The air-fuel mixture is ignited by a conventional ignitor 28 which is mounted in the upper end of reactor section 20.

The air passing through the annular space 23 is rotational flow generates a vortex at the point of fuel injection and allows for the use of low pressure fuels. Rapid mixing of fuel and air at the ignition point results from the vortex.

The combustion is completed within reactor section 20 without any flame extension into the heat exchanger section 14. The gases of combustion exit from the reactor at a high velocity of approximately 300 feet per minute and are discharged through a venturi or nozzle 29 into the central portion of heat exchanger section 14 within the coil 13. The hot gases are then deflected upwardly at the bottom of the heat exchanger section and flow back up on outside of the coil 13 to provide a uniform heat transmission. The gases are discharged from the heat exchanger through the outlet 30.

In operation, when the temperature of the wort reaches 212° F. in the brew kettle, valve 4 is open and pump 10 is operated to circulate wort through the heat exchanger 8. The flow rate is controlled by operation of control valve 17 to provide a preferred flow of about 425 barrels per hour at 15 psig. This results in the wort being heated to a temperature in the range of 220° F. to 240° F., and preferably about 230° F. The returning wort is discharged from pipe 18 in an upward direction in the brew kettle in the direction of percolation, and partial flashing of the wort into steam will occur as it is reintroduced into the brew kettle.

The direct heating of the wort in the coper coils 13 of heat exchanger 8 provides a fire brewing of the wort which imparts improved flavor characteristics to the beer.

Various modes of carrying out the invention are contemplated as being within the scope of the following claims particularly pointing out and distinctly claiming the subject matter which is regarded as the invention.

I claim:

1. A method of brewing, comprising the steps of heating wort to a boiling temperature in a brew kettle, continuously withdrawing wort from the brew kettle and passing the wort at said boiling temperature through a copper hear exchange tube, directly applying hot combustion gases to the tube to heat the wort to a second temperature above said boiling temperature, controlling the rate of flow of said wort through said tube to obtain the desired flavor characteristics in the wort, and continuously returning the wort to the brew kettle.

2. The method of claim 1, wherein said heat exchange tube is in the form of a spiral coil, and said method includes a step of discharging said hot gases of combustion into the center of said coil and in a direction opposite the directional flow of said wort within said coil.

3. The method of claim 2, and including the step of discharging said hot gases of combustion through a nozzle into the center of said coil.

4. The method of claim 2, and including the step of deflecting said gases exiting from the center of said coil rapidly outward and passing said gases longitudinally along the outer surface of said coil.

5. The method of claim 1, wherein the step of heating said wort comprises heating the wort to a temperature in the range of 220° F. to 240° F.

6. An apparatus for brewing, comprising a brew kettle to contain wort, heating means associated with the kettle for heating the wort in the kettle, an external heat exchanger disposed outside said kettle and including a copper heat exchange conduit, pumping means for continuously withdrawing boiling wort from said brew kettle and passing said wort through said conduit and returning said wort to said brew kettle, second heating means separate from said first heating means for supplying hot gases of combustion in direct heat transfer relation to said conduit to heat the wort therein, and flow control means for maintaining said wort in said conduit for a sufficient period of time to develop the desired flavor characteristics for said wort.

7. The apparatus of claim 6, and including discharge means connected to said circulation means for discharging the wort into said brew kettle at a location beneath the level of wort in said kettle.

8. The apparatus of claim 6, wherein said conduit is a spiral coil and said heating means includes means for discharging hot waste gases of combustion into the center of said coil.

9. The apparatus of claim 8, wherein said heat exchanger includes an outer housing surrounding said coil, said heating means being arranged to direct said gases of combustion into the upper end of the center of said coil, said gases flowing downwardly in said center and being deflected upwardly by the lower end of said housing, and a gas discharge outlet connected to the upper end of the housing for discharging the waste gases from said housing.

* * * * *

UNITED STATES PATENT AND TRADEMARK OFFICE
CERTIFICATE OF CORRECTION

PATENT NO. : 4,801,462
DATED : January 31, 1989
INVENTOR(S) : Arthur J. Tonna

It is certified that error appears in the above-identified patent and that said Letters Patent is hereby corrected as shown below:

On the title page

AT INVENTOR: Col. Inventor, line [75], after "Arthur" insert ---J.---

IN THE CLAIMS: Col. 3, line 34, delete "hear" and substitute therefor ---heat---; Col. 4, line 8, delete "rapidly" and substitute therefor ---radially---; Col. 4, line 28, delete "circulation" and substitute therefor ---pumping---; Col. 4, line 32, after "said" insert ---second---; Col. 4, line 37, after "said" insert ---second---

Signed and Sealed this

Second Day of January, 1990

Attest:

JEFFREY M. SAMUELS

Attesting Officer     Acting Commissioner of Patents and Trademarks